US012621611B2

(12) United States Patent
Leschka et al.

(10) Patent No.: US 12,621,611 B2
(45) Date of Patent: May 5, 2026

(54) ELECTRET MICROPHONE

(71) Applicant: Sennheiser electronic SE & Co. KG, Wedemark (DE)

(72) Inventors: Stephan Leschka, Potsdam (DE); Dominic Haul, Berlin (DE)

(73) Assignee: Sennheiser electronic SE & Co. KG, Wedemark (DE)

( * ) Notice: Subject to any disclaimer, the term of this patent is extended or adjusted under 35 U.S.C. 154(b) by 30 days.

(21) Appl. No.: 18/203,814

(22) Filed: May 31, 2023

(65) Prior Publication Data

US 2023/0421966 A1 Dec. 28, 2023

(30) Foreign Application Priority Data

Jun. 3, 2022 (DE) ......................... 102022114073.3

(51) Int. Cl.
*H04R 19/01* (2006.01)
*H04R 1/04* (2006.01)
*H04R 1/22* (2006.01)

(52) U.S. Cl.
CPC ............. *H04R 19/016* (2013.01); *H04R 1/04* (2013.01); *H04R 1/222* (2013.01)

(58) Field of Classification Search
CPC ......... H04R 19/016; H04R 1/04; H04R 1/222
See application file for complete search history.

(56) References Cited

U.S. PATENT DOCUMENTS

| | | | | |
|---|---|---|---|---|
| 2004/0109579 A1* | 6/2004 | Izuchi | H01G 7/02 | 381/174 |
| 2009/0034760 A1* | 2/2009 | Minamio | H04R 19/005 | 381/175 |
| 2010/0002895 A1* | 1/2010 | Notake | H01G 7/02 | 381/174 |
| 2019/0389721 A1* | 12/2019 | Doller | H04R 19/005 | |

FOREIGN PATENT DOCUMENTS

| | | | | |
|---|---|---|---|---|
| CN | 1 481 654 A | | 3/2004 | |
| CN | 2826881 Y | * | 10/2006 | |
| DE | 10 2018 108 720 B4 | | 10/2019 | |
| DE | 102018108720 A1 | * | 10/2019 | H04R 19/016 |

OTHER PUBLICATIONS

Search Report dated Jun. 3, 2022 issue in the corresponding German application No. 10 2022 114 073.3.

* cited by examiner

*Primary Examiner* — Fan S Tsang
*Assistant Examiner* — Tyler Michael Liebgott
(74) *Attorney, Agent, or Firm* — Jon E. Gordon; Haug Partners LLP

(57) ABSTRACT

An electret microphone is provided. It comprises an electrically conductive membrane and a counter-electrode having at least one first hole at a first distance from an edge of the counter-electrode, and a second plurality of second holes each at a second distance from the edge. The second distance is shorter than the first. The microphone includes a first electrically conductive coating on a first side of the counter-electrode and a second electrically conductive coating on a (Continued)

second side. The at least one first hole comprises a via to electrically contact the first and second coatings. A third distance is provided between the second holes and the first coating so that the first coating does not extend to the second holes. The microphone further comprises a polarizable film extending completely over the first coating while leaving the first and second holes free, and extending to the second holes.

4 Claims, 3 Drawing Sheets

ELECTRET MICROPHONE

CROSS-REFERENCE TO RELATED APPLICATIONS

This application claims priority under 35 U.S.C. § 119(b) to German Patent Application No. 102022114073.3, filed Jun. 3, 2022, the entirety of which is herein incorporated by reference.

FIELD OF DISCLOSURE

The present invention relates to an electret microphone.

BACKGROUND

An electro-acoustic capacitor microphone comprises a movable, thin, electrically conducting membrane (first electrode) and a fixed second electrode (counter-electrode). The membrane can either be metallic or non-metallic and can be provided with an electrically conducting coating on one or both sides. The electrode and the counter-electrode are located at a short distance from one another with an interposed air gap. In an electret microphone an electret layer is located on the counter-electrode between the electrode and the counter-electrode in order to generate the necessary electric field between the electrode and the counter-electrode.

DE 10 2018 108 720 B4 discloses an electret microphone. A conductive layer is provided on a substrate. Furthermore, a membrane is provided with a conductive layer. The circular substrate body can be made from a high-quality, shape-resistant plastic. The substrate body has a bore which is also metallized in order to electrically connect the front and rear coating to one another. Further bores can also be provided in order to provide an acoustic connection between the air volume under the membrane and a rear volume.

SUMMARY OF THE INVENTION

It is an object of the present invention to provide an electret microphone which is better protected against air humidity.

This object is achieved by an electret microphone according to Claim 1.

Thus, an electret microphone is provided which comprises an electrically conductive membrane and a counter-electrode having at least one first hole having a first distance from an edge of the counter-electrode and a second plurality of second holes each having a second distance from the edge of the counter-electrode, wherein the second distance is shorter than the first distance. The electret microphone has a first electrically conductive coating on a first side of the counter-electrode and a second electrically conductive coating on a second side of the counter-electrode. The at least one first hole comprises a via in order to electrically contact the first and second electrically conductive coating. At least a third distance is provided in each case between the second holes and the first electrically conductive coating so that the first electrically conductive coating does not reach as far as the second holes. Furthermore, a polarizable film is provided which extends completely over the first electrically conductive coating and thereby leaves free the first and second holes, wherein the polarizable film extends as far as the second holes.

Thus, the holes near the edges are not provided with a via. As a result of the region around the second holes remaining free of the first electrically conductive coating whereas the film extends as far as the second holes, the insulation towards the edge of the counter-electrode can be improved even when moisture is present.

According to one aspect, the counter-electrode has a mid-point. The at least one first hole is arranged in a first radius around the mid-point. The plurality of second holes is arranged in a second radius about the mid-point, wherein the first radius is smaller than the second radius. The counter-electrode is circular with a third radius. The first electrically conductive layer is arranged maximally in a fourth radius about the mid-point. The fourth radius is smaller than the third radius so that an edge region of the counter-electrode remains free from the first electrically conductive layer. The polarizable film covers the edge region.

According to one aspect, the fourth radius is greater than the second radius so that the electrically conductive coating extends radially beyond second holes. Thus, the area of the conductive coating can be enlarged.

According to one aspect, the microphone comprises a printed circuit board which is arranged opposite to the second electrically conductive coating. An electrically conductive connection is provided between the printed circuit board and the second electrically conductive coating.

According to one aspect, a region around the second holes remains free from the first electrically conductive coating whereas the polarizable film extends as far as an edge of the second holes so that the polarizable film covers the region.

According to one aspect, the first and second electrically conductive coating can be configured as an electrically conductive layer.

According to one aspect, an electret microphone is provided with a membrane, a counter-electrode, an electrically conductive coating of the counter-electrode, a first plurality of holes in a first circle, and a second plurality of holes in a second circle, wherein the radius of the second circle is greater than the radius of the first circle. At least one hole in the first circle has a via which is connected electrically to the electrically conductive coating of the counter-electrode. A polarizable FEP film is provided on the counter-electrode, which covers an upper side of the counter-electrode with the exception of the holes.

The film is placed on the counter-electrode so that it covers the entire counter-electrode with the exception of the first and second holes. This has the result that, in particular in an edge region of the counter-electrode, i.e. at the outer edge of the counter-electrode, the electrode is covered with the film. The film can, for example, be a fluoroethylene propylene film.

By providing the film on the counter-electrode, the counter-electrode can be better protected against air moisture.

It is therewith achieved that the electrically conductive coating is completely covered by the film. Thus, even at the holes near the edges (i.e. the second holes), creeping currents can be prevented when moisture is present.

The counter-electrode can optionally be configured to be circular with a mid-point. A first plurality of holes is provided in a first radius about the mid-point. A second plurality of holes is provided in a second radius about the mid-point. The second radius is in this case greater than the first radius. The counter-electrode has a third radius which is greater than the first and second radius. The conductive coating on the substrate of the counter-electrode does not extend as far as the edge of the counter-electrode but has a fourth radius that is greater than the second but smaller than the third radius. In the region between the third and fourth radius the film is therefore located directly on the substrate.

Otherwise, the conductive coating is provided between the upper side of the counter-electrode and the FEP film. Thus, the entire free surface of the counter-electrode (without the first and second holes) is covered by the film.

According to one aspect of the present invention, the first holes (having the first radius) have a via which electrically connects the conductive layer on the first and second side (upper side, lower side) of the counter-electrode to one another.

With the electret microphone according to the invention, a microphone can be provided which has a low noise with a high insensitivity to moisture at the same time.

Further embodiments of the invention are the subject matter of the dependent claims.

BRIEF DESCRIPTION OF THE DRAWINGS

Advantages and exemplary embodiments of the invention are explained in detail hereinafter with reference to the drawings.

DETAILED DESCRIPTION

Figure 1:
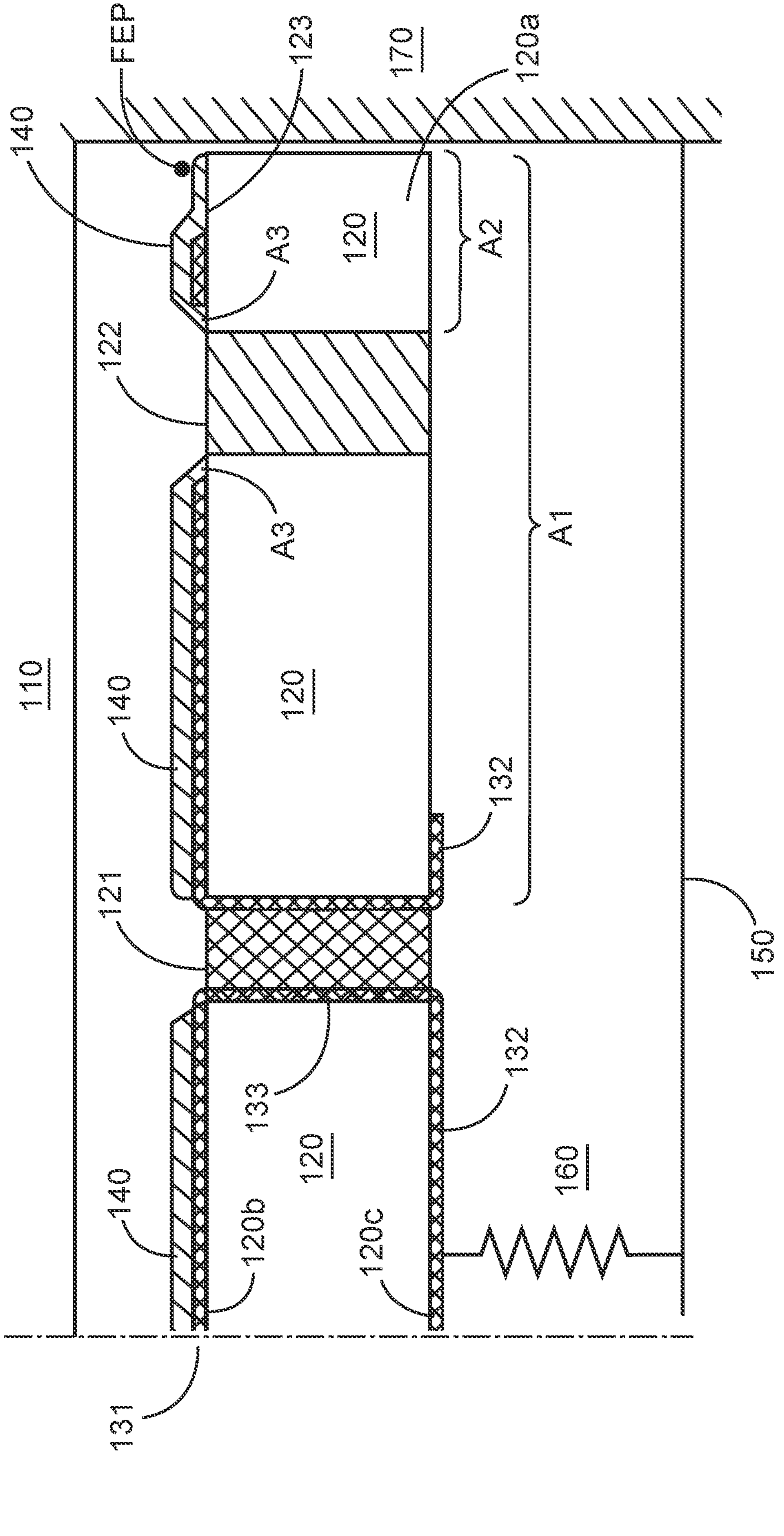
FIG. 1 shows a sectional view of an electret microphone according to a first exemplary embodiment.

FIG. 1 shows a sectional view of an electret microphone according to a first exemplary embodiment of the invention. The electret microphone 100 comprises a membrane 110, a counter-electrode 120 with an edge 120*a*, at least one first hole 121 and a plurality of second holes 122. The counter-electrode 120 has a first and a second side 120*b*, 120*c*. An electrically conductive coating 131 is provided on the first side 120*b* and a second electrically conductive coating 132 is provided on the second side 120*c*. An FEP film 140 is provided on the first side 120*b* of the counter-electrode 120, which covers the first electrically conductive layer 131. In addition, the film 140 also covers a region 123 of the counter-electrode 120 which is not covered by the first electrically conductive coating 131. However, the film 140 covers neither the first nor the second holes 121, 122. For this purpose the film 140 can have recesses at the corresponding positions. The at least one first hole 121 has a first distance A1 from an edge 120*a* of the counter-electrode 120 and the plurality of second holes 122 has a second distance A2 from the edge 120*a* of the counter-electrode 120. The second distance A2 is shorter than the first distance A1. The second holes are therefore close to the edge whereas the first holes are provided further removed from the edge.

Optionally the film 140 can reach an edge of the first and second holes 121, 122. The first electrically conductive coating 131 can at least partially have a third distance A3 from an edge of the second holes 122. Thus, a section 125 having a width of the third distance A3 between the edge of the second holes 122 and the first electrically conductive coating 131 can be provided. This section 125 around the second holes 122 has no first electrically conductive coating 131 but is covered by the film 140.

The electret microphone 100 further comprises a printed circuit board 150 on which the electrical and electronic components are provided for a signal processing of the signals of the electret microphone. The printed circuit board 150 can optionally also have acoustic elements such as holes or dampings. A spring for contacting can be provided between the second electrically conductive layer 132 and the printed circuit board 150.

The electret microphone electret microphone 100 and in particular the counter-electrode 120 can be configured to be circular and can be placed in a housing 170. Optionally the housing 170 surrounds the counter-electrode 120 and the membrane 110 radially.

Figure 2:
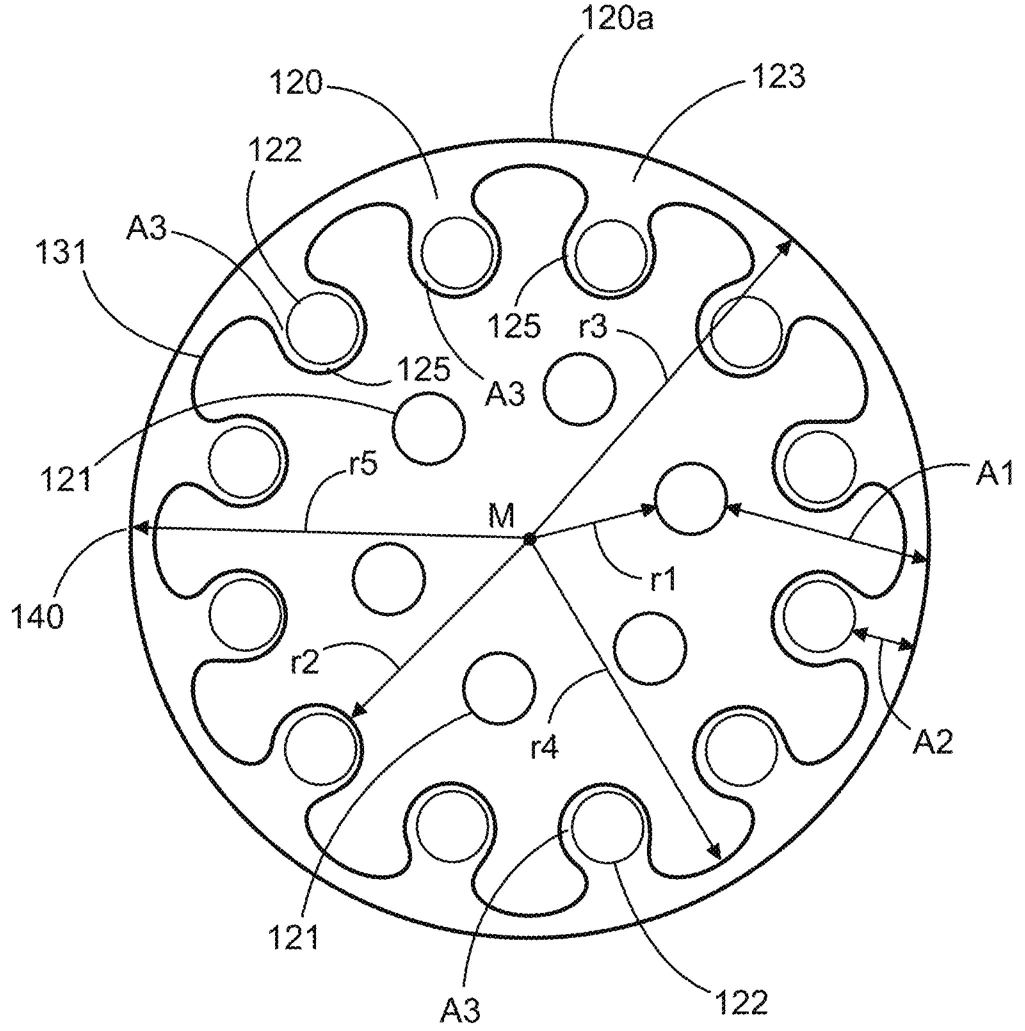
FIG. 2 shows a plan view of an electret microphone according to a first exemplary embodiment and FIG. 3 shows a perspective view of a counter-electrode for an electret microphone.
Figure 3:
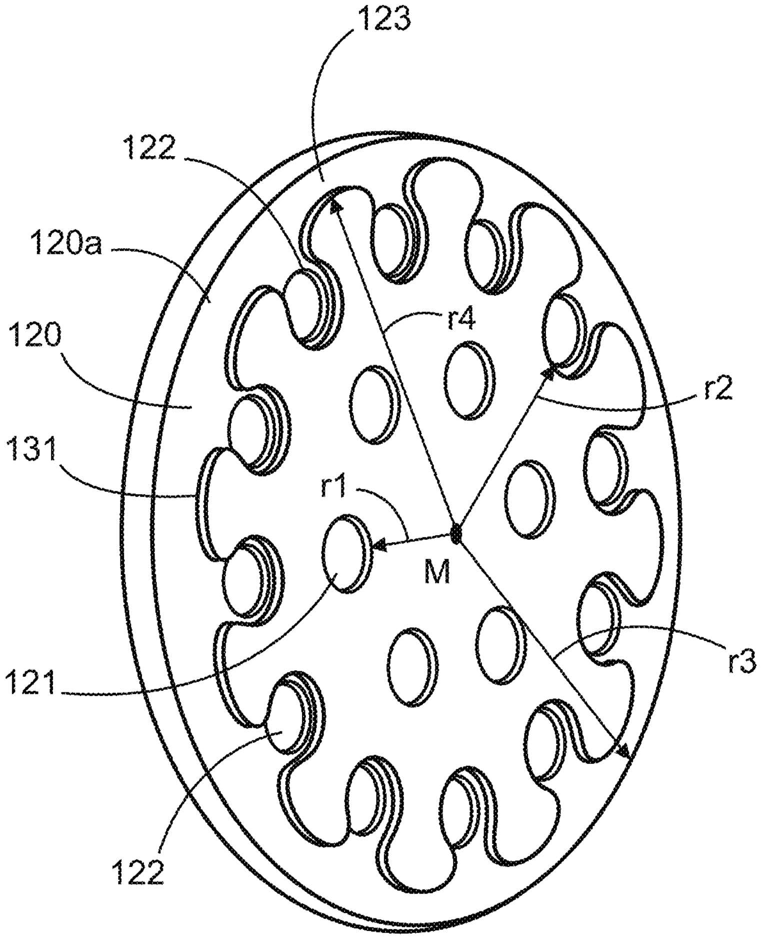

FIG. 2 shows a plan view of a counter-electrode for an electret microphone according to FIG. 1 and FIG. 3 shows a perspective view of a counter-electrode 120 for an electret microphone 100 according to FIG. 1.

The counter-electrode 120 has at least one hole 121 or a first plurality of holes 121 which can be arranged on a circle about a mid-point M of the counter-electrode having a first radius r1. The counter-electrode 120 has a plurality of second holes 122 which can be arranged about the mid-point M of the counter-electrode 120 having a second radius r2. A first electrically conductive coating or layer 131 is applied to the counter-electrode 120 (i.e. on a first side 120*b*). The electrically conductive layer 131 does not cover the first and second holes 121, 122.

The counter-electrode 120 has a first edge 120*a*, can be configured to be circular and can have a third radius r3. The first electrically conductive layer 131 maximally has a fourth radius r4. The third radius r3 is greater than the first, second and fourth radius r1, r2 and r4. The fourth radius r4 is smaller than the third radius r3 and larger than the second radius r2. The second radius r2 is larger than the first radius r1.

The at least one first hole 121 has a first distance A1 from an edge 120*a* of the counter-electrode 120 and the plurality of second holes 122 have a second distance A2 from the edge 120*a* of the counter-electrode 120. The second distance A2 is smaller than the first distance A1. The first plurality of holes 121 can optionally be arranged in a circle having the first radius r1 about a mid-point M of the counter-electrode 120. The second plurality of holes 122 is arranged about a further circle having a larger radius (second radius r2) about the mid-point M of the counter-electrode 120. Optionally the arrangement of the holes 121 and 122 can differ from a circular shape. It is crucial that the second plurality of holes is arranged closer to an outer edge 120*a* of the counter-electrode than the first plurality of holes 121. Optionally only a single first hole 121 can be provided that is further removed from the edge 120*a* of the counter-electrode 120 than the second holes 122.

The film 140 completely covers the first electrically conductive coating or layer 131 on the first side 102*b* of the counter-electrode 120. Optionally the film 140 can be provided in a circular form about the mid-point M having a fifth radius r5, wherein the fifth radius r5 is larger than the maximum fourth radius r4 of the electrically conductive layer 131. The radius r5 can optionally correspond to the radius r3. Thus, a region 123 is provided on the edge 120*a* of the counter-electrode 120 which, however, is not covered by the film 140 due to the first electrically conductive coating. In this region, the film 140 lies directly on the counter-electrode 120.

A region 125 having a width of the third distance A3 can be provided between an edge of the second holes 122 and the first electrically conductive coating, electrically conductive coating electrically conductive coating, which is also only covered by the film 140 but not by the first electrically conductive coating 131.

Since the electrically conductive layer 131 does not extend as far as the edge 120*a* of the counter-electrode 120 and film 140 printed circuit board 150 goes beyond the edge of the conductive layer 131 and therefore completely covers this in the edge region, an electrical insulation towards the housing 170 can be achieved. Thus, creeping currents to the housing can also be reliably avoided even when substantial moisture develops.

According to one aspect of the present invention, the first holes 121 have a via 133 by means of which the first and second electrically conductive coating or layer 131, 132 are electrically connected to one another. Optionally the second electrically conductive layer 132 can be coupled to a printed circuit board 150 by means of the conductive spring 160.

According to one aspect of the invention, the FEP film 140 covers the entire surface of the counter-electrode 120 with the exception of the first and second holes 121, 122. Thus, the film 140 also covers the edge region 123 of the counter-electrode 120.

According to one aspect of the present invention, only the first holes 121 have a via 133 whereas the second holes 122 have no via.

As shown in FIG. 1, the first electrically conductive coating 131 in the region of the second holes 122 can have a third distance A3 to the respective hole 122 in each case whereas the film 140 extends as far as the edge of the second holes 122 in each case and thus the first electrically conductive coating completely covers the region 123 at the second holes 122. In this way, the conductive layer 131 in the region of the second holes 122 near the edge is covered in a highly insulating manner in order to reliably prevent creeping currents from the conductive layer 131 to the housing 170 even with high moisture.

According to one aspect of the present invention, the substrate of the counter-electrode is made of ceramic and therefore highly insulating.

After the electrically conductive layer 131, 132, 133 has been applied to the substrate of the counter-electrode, the film 140 can be placed thereon. Optionally the application of the electrically conductive layer 131, 132, 133 is accomplished via a sputtering process.

With the electret microphone according to the invention, the resistance of the electret microphone to a high moisture is maximized. This is accomplished despite the small size and therefore the small area of the counter-electrode and enables a very low intrinsic noise.

As a result of the configuration according to the invention of the first electrically conductive layer on the (upper) side of the substrate of the counter-electrode, it is achieved that a reduction of the capsule capacity is avoided whilst simultaneously increasing the resistance to moisture.

The resistance to moisture is increased by not applying the electrically conductive layer 131, 132, 133 in the edge region 123 of the substrate of the counter-electrode 120. Furthermore, the electrically conductive layer in the region of the second holes 122 is adapted so that in a region between the second holes and the edge of the substrate of the counter-electrode no electrically conductive coating is provided. The electrically conductive coating 131, 132, 133 is substantially provided in the region between adjacent second holes 122 and in the direction of the edge 120*a*. In particular, an exemption of the holes is accomplished in the outer circle and its direct surroundings. Furthermore, a polarizable FEP film is placed over the surface of the counter-electrode so that only the first and second holes 121, 122 remain free.

According to one aspect of the present invention, the electrically conductive layer 131, 132, 133 is a gold layer and can be applied by sputtering.

With the electret microphone according to the invention, it can be ensured that the counter-electrode of the electret microphone is electrically insulated with respect to the surrounding metal housing. This can be achieved, for example, whereby the electrically conductive first and second layer does not extend as far as the housing 170 but leaves the region 123 free. Thus, leakage currents can be reduced. Furthermore, it is desirable to have the largest possible region that is electrically conductive in order to increase the capacity of the electret microphone and thereby reduce the intrinsic noise.

According to the invention, a counter-electrode having a substrate made of a highly insulating material such as, for example, ceramic is provided which has first and second holes. The acoustic frequency response can be adjusted with the holes. The surface of the counter-electrode is completely (except for the holes) covered with an electrically polarized FEP film. A first electrically conductive layer is provided on the upper side of the substrate of the counter-electrode. The FEP layer extends as far as the edge of the counter-electrode and only the first and second holes are not covered.

Preferably the first holes 121 (having a small radius) are used for through-contacting. This is advantageous since a larger distance from the housing 170 is thus provided so that leakage currents can also be reduced.

Thus, an electret microphone having the largest possible electrode surface is provided which reliably avoids leakage currents in relation to the surrounding housing which can be caused by excessive air moisture.

The invention claimed is:

1. An electret microphone, comprising:

an electrically conductive membrane;

a counter-electrode having at least one first hole having a first distance from an edge of the counter-electrode and a second plurality of second holes each having a second distance from the edge of the counter-electrode, wherein the second distance is shorter than the first distance;

a first electrically conductive coating directly on a first side of the counter electrode and a second electrically conductive coating directly on a second side of the counter-electrode, wherein the at least one first hole comprises a via in order to electrically contact the first and second electrically conductive coating, wherein at least a third distance is provided in each case between the second holes and the first electrically conductive coating so that the first electrically conductive coating does not reach as far as the second holes, and the second holes are isolated from the first conductive coating; and a polarizable film which covers the first side of the counter electrode and extends completely over the first electrically conductive coating and thereby leaves free the first and second holes.

2. An electret microphone according to claim 1, wherein the counter-electrode has a midpoint, wherein the at least one first hole is arranged in a first radius around the midpoint, wherein the plurality of second holes is arranged in a second radius about the midpoint, wherein the first radius is smaller than the second radius, wherein the counter-electrode is configured to be circular with a third radius, wherein the first electrically conductive coating is arranged maximally in a fourth radius about the midpoint, wherein the fourth radius is smaller than the third radius so that an edge region of the counter-electrode remains free from the first electrically conductive coating, wherein the polarizable film covers the edge region.

3. An electret microphone according to claim 1, further comprising:

a printed circuit board which is arranged opposite to the second electrically conductive coating, wherein an electrically conductive connection is provided between the printed circuit board and the second electrically conductive coating.

4. An electret microphone according to claim 1, wherein a region around the second holes remains free of the first electrically conductive coating, wherein the polarizable film extends as far as an edge of the second holes so that the polarizable film covers the region.

* * * * *